US008054214B2

(12) United States Patent
Bunch

(10) Patent No.: US 8,054,214 B2
(45) Date of Patent: Nov. 8, 2011

(54) SYSTEMS AND METHODS FOR PREPARING GROUND-BASED WEATHER RADAR INFORMATION FOR USE IN AN INSTALLATION VEHICLE

(75) Inventor: Brian Paul Bunch, Snohomish, WA (US)

(73) Assignee: Honeywell International Inc., Morristown, NJ (US)

( * ) Notice: Subject to any disclaimer, the term of this patent is extended or adjusted under 35 U.S.C. 154(b) by 91 days.

(21) Appl. No.: 12/571,132

(22) Filed: Sep. 30, 2009

(65) Prior Publication Data
US 2011/0074624 A1 Mar. 31, 2011

(51) Int. Cl.
*G01S 13/00* (2006.01)

(52) U.S. Cl. .......... 342/26 R; 342/26 A; 342/26 B; 342/26 C; 342/26 D

(58) Field of Classification Search .......... 342/26 R, 342/26 A, 26 B, 26 C, 26 D
See application file for complete search history.

(56) References Cited

U.S. PATENT DOCUMENTS

| | | | |
|---|---|---|---|
| 4,050,067 A | 9/1977 | Elmore, Jr. | |
| 4,170,006 A | 10/1979 | Falk | |
| 4,660,044 A | 4/1987 | Lavelle | |
| 4,963,036 A | 10/1990 | Drisko et al. | |
| 5,166,688 A | 11/1992 | Moreira | |
| 5,196,854 A | 3/1993 | Mathews | |
| 5,198,819 A | 3/1993 | Susnjara | |
| 5,265,024 A | 11/1993 | Crabill et al. | |
| 5,363,107 A * | 11/1994 | Gertz et al. .......... | 342/26 B |
| 5,530,909 A | 6/1996 | Simon et al. | |
| 5,657,009 A * | 8/1997 | Gordon .......... | 340/968 |
| 5,988,862 A | 11/1999 | Kacyra et al. | |
| 6,043,756 A * | 3/2000 | Bateman et al. .......... | 340/945 |
| 6,044,336 A | 3/2000 | Marmarelis et al. | |
| 6,148,261 A | 11/2000 | Obradovich et al. | |
| 6,232,913 B1 | 5/2001 | Lehtinen | |
| 6,246,468 B1 | 6/2001 | Dimsdale | |
| 6,330,523 B1 | 12/2001 | Kacyra et al. | |
| 6,420,698 B1 | 7/2002 | Dimsdale | |
| 6,441,773 B1 * | 8/2002 | Kelly et al. .......... | 342/26 R |
| 6,448,922 B1 * | 9/2002 | Kelly .......... | 342/26 R |
| 6,456,226 B1 | 9/2002 | Zheng et al. | |

(Continued)

FOREIGN PATENT DOCUMENTS
WO WO9940457 A1 12/1999

OTHER PUBLICATIONS

Richard Mamrosh, "Aircraft Weather Observations Improve Forecasts," The Front, vol. 2, No. 2, pp. 7; Jul. 2003.

(Continued)

*Primary Examiner* — Thomas Tarcza
*Assistant Examiner* — Peter Bythrow
(74) *Attorney, Agent, or Firm* — Lowe Graham Jones PLLC

(57) ABSTRACT

Systems and methods prepare ground-based supplemental weather radar information for integration with onboard weather radar information. An exemplary embodiment receives ground-based weather radar information from a ground-based weather radar station, the ground-based weather radar information referenced in a first coordinate system; generates supplemental weather radar information from the received ground-based weather radar information, wherein the supplemental weather radar information is referenced to a second coordinate system based upon at least latitude and longitude; and communicates the supplemental weather radar information, wherein the communicated supplemental weather radar information is integrated with weather radar information of an onboard weather radar system of an installation vehicle.

20 Claims, 6 Drawing Sheets

U.S. PATENT DOCUMENTS

| | | | |
|---|---|---|---|
| 6,473,079 | B1 | 10/2002 | Kacyra et al. |
| 6,501,392 | B2 * | 12/2002 | Gremmert et al. ............ 340/971 |
| 6,512,518 | B2 | 1/2003 | Dimsdale |
| 6,512,993 | B2 | 1/2003 | Kacyra et al. |
| 6,563,452 | B1 * | 5/2003 | Zheng et al. ................ 342/26 R |
| 6,583,751 | B1 | 6/2003 | Ferretti et al. |
| 6,667,710 | B2 | 12/2003 | Cornell et al. |
| 6,707,415 | B1 | 3/2004 | Christianson |
| 6,744,382 | B1 * | 6/2004 | Lapis et al. .................... 340/971 |
| 6,771,207 | B1 * | 8/2004 | Lang ........................... 342/26 R |
| 6,828,922 | B1 * | 12/2004 | Gremmert et al. ............ 340/949 |
| 6,865,452 | B2 | 3/2005 | Burdon |
| 6,917,860 | B1 | 7/2005 | Robinson et al. |
| 6,977,604 | B2 | 12/2005 | Wada et al. |
| 6,977,608 | B1 * | 12/2005 | Anderson et al. ........... 342/26 B |
| 7,027,898 | B1 | 4/2006 | Leger et al. |
| 7,039,505 | B1 * | 5/2006 | Southard et al. ................... 701/3 |
| 7,081,834 | B2 | 7/2006 | Ruokangas et al. |
| 7,085,562 | B1 | 8/2006 | Holder et al. |
| 7,365,673 | B2 | 4/2008 | Makkapati et al. |
| 7,379,816 | B2 * | 5/2008 | Southard et al. .............. 701/300 |
| 7,463,955 | B1 * | 12/2008 | Robinson et al. .................. 701/3 |
| 7,467,031 | B2 * | 12/2008 | King ................................. 701/4 |
| 7,471,995 | B1 * | 12/2008 | Robinson .......................... 701/3 |
| 7,474,250 | B2 | 1/2009 | Makkapati et al. |
| 7,515,088 | B1 | 4/2009 | Woodell et al. |
| 7,633,428 | B1 * | 12/2009 | McCusker et al. .......... 342/26 B |
| 7,646,328 | B2 * | 1/2010 | Makkapati et al. ......... 342/26 R |
| 7,728,758 | B2 * | 6/2010 | Varadarajan et al. ....... 342/26 B |
| 7,821,448 | B2 * | 10/2010 | Mahapatra et al. ........... 342/179 |
| 2002/0039072 | A1 * | 4/2002 | Gremmert et al. ............ 340/945 |
| 2003/0016155 | A1 * | 1/2003 | Szeto et al. ..................... 342/26 |
| 2004/0183695 | A1 | 9/2004 | Ruokangas et al. |
| 2006/0145912 | A1 | 7/2006 | Makkapati et al. |
| 2006/0202886 | A1 * | 9/2006 | Mahapatra et al. ........... 342/176 |
| 2008/0040038 | A1 * | 2/2008 | Southard et al. .............. 701/300 |
| 2008/0158049 | A1 * | 7/2008 | Southard et al. ............ 342/26 R |

OTHER PUBLICATIONS

Rediess et al., "Autonomous Civil Aircraft—The Future of Aviation," Aerospace America, pp. 40-43, Jul. 2006.

H. Paul Stough III, "Aircraft Weather Mitigation for the Next Generation Air Transportation System," NASA Langley Research Center, 15.8, pp. 1-6, Dec. 2004.

Thomas A. Horne, "Future Flight: Links to Tomorrow," AOPA Online, http://www.aopa.org/pilot/features/future0002.html, vol. 43, No. 2, Feb. 2000.

Jason Fritz and V. Chandrasekar, Simultaneous Observations of a Tropical Cyclone from Dual-Pol TerraSAR-X and Ground Based Weather Radar, Colorado State University Electrical & Computer Engineering Dept. 1373 Campus Delivery, Fort Collins, CO 80523-1373, Radar Conference, 2009 IEEE, Pi scatahlay, NJ, USA, May 4, 2009, pp. 1-6.

NexRAD Radar: "View the Big Picture up to 500 Miles Ahead and Fly the Smartest Route Between Two Points"; Echo Flight https://www.echoflight.com/nexrad.html; 1 page printed Apr. 28, 2009.

Richard C. Wilson et al.; "A Radar Reflectance Model for Terrain Analysis Using Shape From Shading"; proceedings of the International Conference for Image Analysis Processing; pp. 868-873; Sep. 27-29, 1999.

Brian P. Bunch et al.; Systems and Methods for Using Nexrad Information to Verify Weather Radar Information; U.S. Appl. No. 12/476,726, filed Jun. 2, 2009.

Control Vision Corp.; Anywhere Wx—Aviation Weather; http://web.archive.org/web/20070202054903/http://www.anywheremap.com/aviation-weather.aspx; 2005.

* cited by examiner

US 8,054,214 B2

SYSTEMS AND METHODS FOR PREPARING GROUND-BASED WEATHER RADAR INFORMATION FOR USE IN AN INSTALLATION VEHICLE

BACKGROUND OF THE INVENTION

Weather radars, such as found on aircraft or marine vessels, display hazardous weather information based upon analyzed radar returns. Radar return information corresponding to detected hazardous weather information is presented to the crew of the aircraft or marine vessel on a display, typically using a plan view showing a geographic area over which the aircraft or vessel is traversing.

However, weather radars have a limited effective range. Supplemental weather radar information may be provided to the aircraft from remote sources. For example, ground-based weather radar systems can provide supplemental weather radar information to an aircraft. An exemplary supplemental weather radar information apparatus and method is described in the commonly assigned U.S. utility application to Brian Bunch, et. al., entitled, "SYSTEMS AND METHODS FOR USING NEXRAD INFORMATION TO VERIFY WEATHER RADAR INFORMATION," having Ser. No. 12/476,726, filed on Jun. 2, 2009, which is incorporated herein by reference in its entirety.

Aircraft weather information may be based upon two-dimensional (2-D) databases which are filled with radar return information (using bins, for example, based on range and bearing values with respect to the current location of the aircraft). In other embodiments, the presented weather radar displays may be based upon 3-D databases which are filled with radar return information (using 3-D bins or voxels, for example, based on range, azimuth, and bearing values with respect to the current location of the aircraft). An exemplary embodiment of a 3-D weather radar system is implemented in accordance with the commonly assigned U.S. Pat. No. 6,667,710, filed on Feb. 19, 2002, to Cornell et al., which is incorporated herein by reference in its entirety.

Although ground-based supplemental weather radar information may extend the effective range of an aircraft's airborne radar system, such ground-based supplemental weather radar information is not available in a format that is readily integrated into an airborne radar weather information database. Accordingly, it is desirable to improve the ground-based supplemental weather radar information for integration into the aircraft's airborne radar weather information database. Similar needs exist in other types of radar systems that may be configured to incorporate supplemental weather radar information into their respective radar information databases.

SUMMARY OF THE INVENTION

Systems and methods that prepare ground-based supplemental weather radar information for integration with onboard weather radar information are disclosed. An exemplary embodiment receives ground-based weather radar information from a ground-based weather radar station, the ground-based weather radar information referenced in a first coordinate system; generates supplemental weather radar information from the received ground-based weather radar information, wherein the supplemental weather radar information is referenced to a second coordinate system based upon at least latitude and longitude; and communicates the supplemental weather radar information, wherein the communicated supplemental weather radar information is integrated with weather radar information of an onboard weather radar system of an installation vehicle.

BRIEF DESCRIPTION OF THE DRAWINGS

Preferred and alternative embodiments are described in detail below with reference to the following drawings.

DETAILED DESCRIPTION OF THE PREFERRED EMBODIMENT

A weather radar information system 100 processes ground-based weather radar information received from one or more ground-based weather radar stations 102 into supplemental weather radar information. The supplemental weather radar information is then communicated to an installation vehicle, such as, but not limited to, an aircraft 104. The term "weather" generally refers to any type of weather radar detectable weather phenomena, such as, but not limited to, storm cells, turbulence regions, lightning, precipitation, hail, snow, wind shear, icing conditions, and the like that the installation vehicle may encounter. Embodiments of the weather radar information system 100 may communicate the supplemental weather radar information to any suitable installation vehicle.

Figure 1:
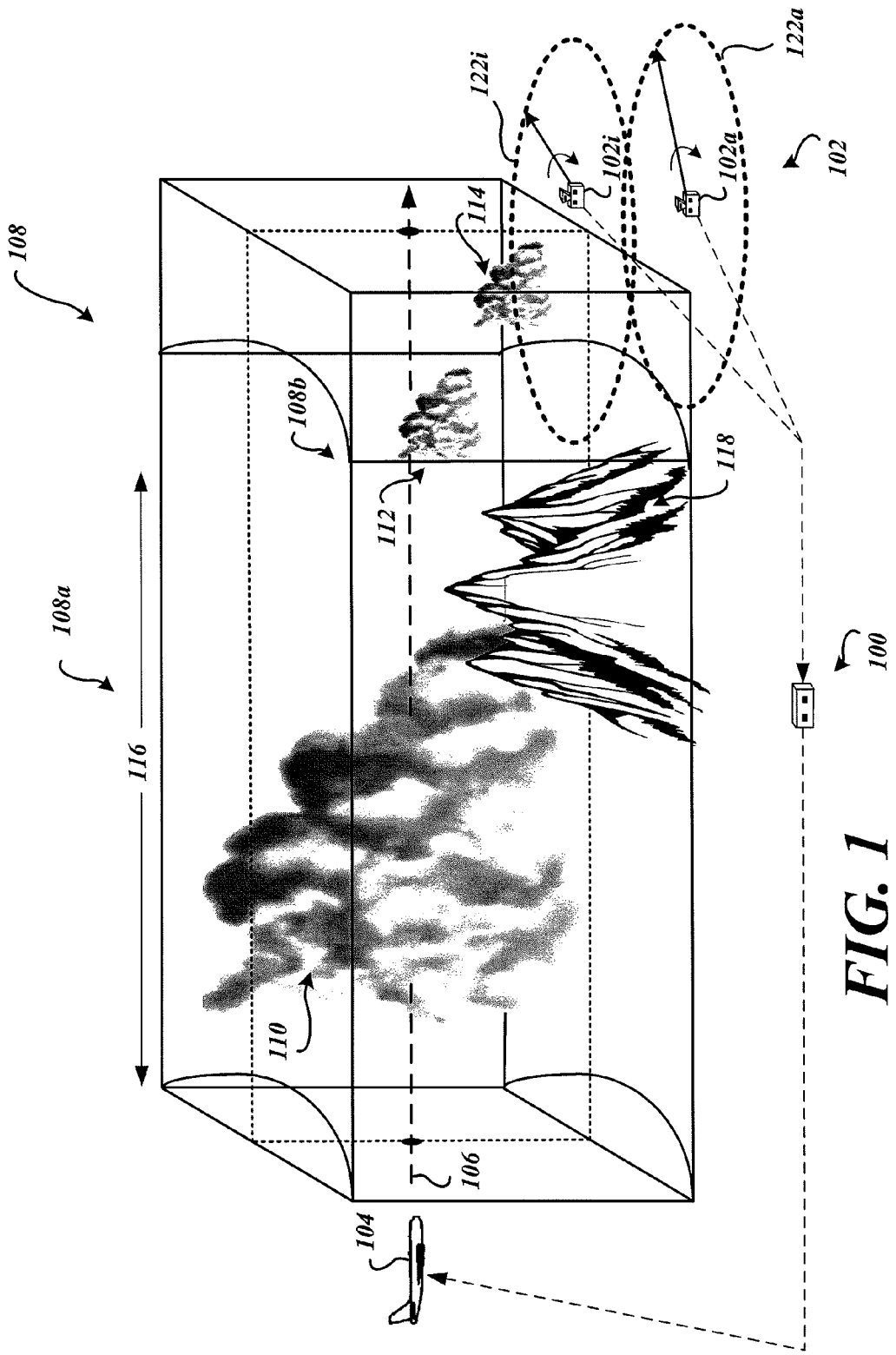
FIG. 1 is a perspective view of a portion of a planned flight path of an aircraft through a region of space having a plurality of storm cells, some of which are along the radar horizon or are beyond the effective range of the aircraft's onboard weather radar.

FIG. 1 is a perspective view of a portion of a planned flight path 106 of the aircraft 104 through a region of space 108 having a plurality of storm cells 110, 112, 114, some of which may be beyond the effective range of the aircraft's onboard weather radar. In FIG. 1, an illustrated region of space 108a is within an effective detection range 116 of the weather radar of the aircraft 104. Here, the illustrated storm cell 110 is detectable by the onboard weather radar of the aircraft 104.

However, a region 108b exists along the planned flight path 106 that is beyond the effective detection range 116 of the aircraft's onboard weather radar. For example, the mountain range 118 simply blocks out and prevents detection of weather that is behind a mountain range 118. Thus, the storm cell 112, which is behind the peaks of the mountain range 118, cannot be identified. Further, the storm cell 114 lies beyond the effective detection range 116 of the aircraft's onboard weather radar. Accordingly, the aircraft 104 cannot detect the storm cell 114.

The ground-based weather radar stations 102a-102i can reliably detect weather in their respective detection ranges 122a, 122i generally defined by a radius about the ground-based weather radar stations 102a-102i. In this simplified example, ground-based weather radar stations 102a-102i are located relatively near the storm cells 112, 114. Therefore, the storm cells 112, 114 are detectable by at least one of the respective detection ranges 122a, 122i.

An example of ground-based weather radar information in the United States is the NEXRAD (next generation radar) weather information collected by a plurality of ground-based weather radar stations 102a-102i forming the NEXRAD network. Other examples of sources of ground-based weather radar information include single ground radar sites, or networks of coordinated ground-based radar sites, such as, but not limited to, the PANTHERE system in France.

Figure 2:
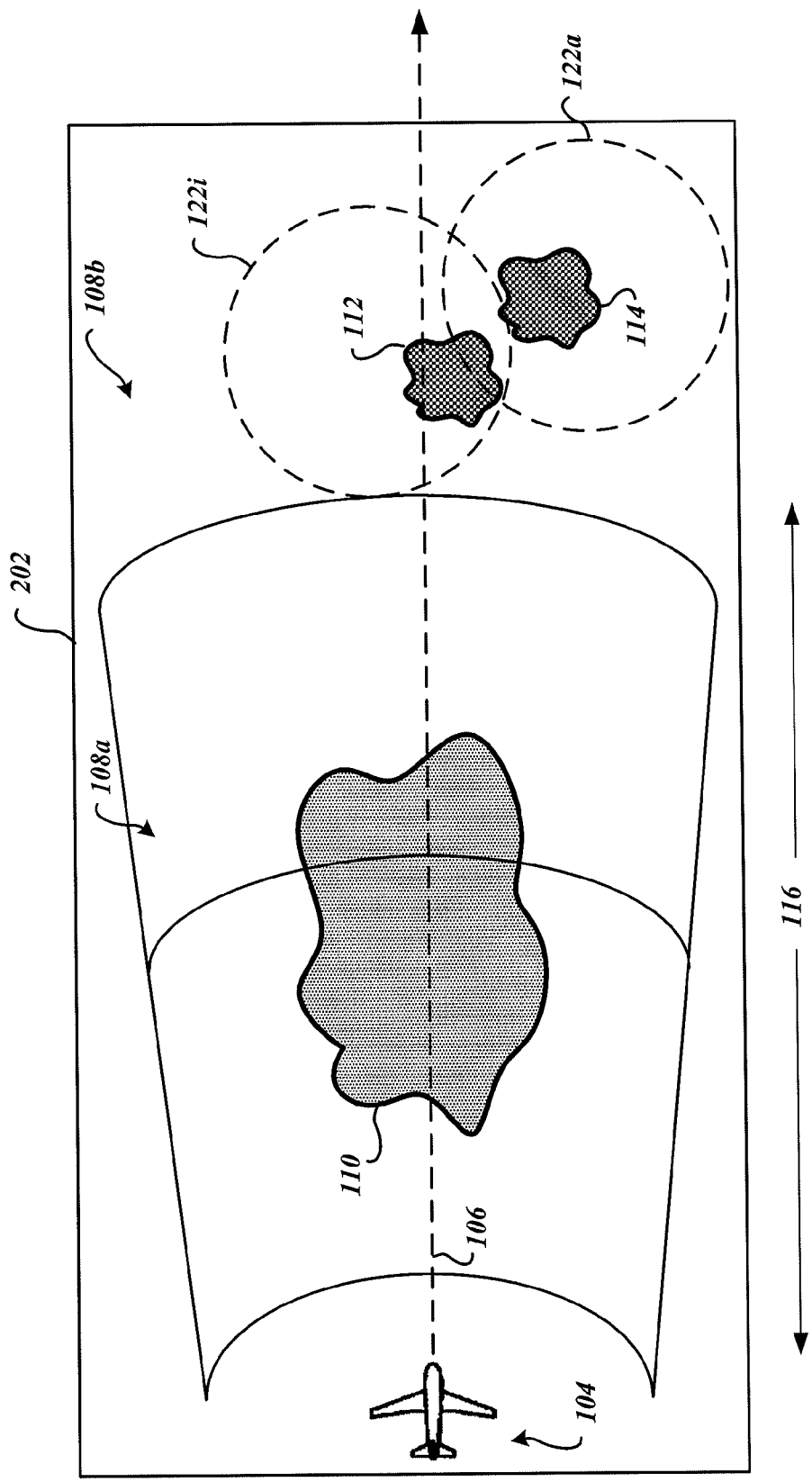
FIG. 2 is a plan view illustrating the effective detection range of the aircraft's onboard weather radar and the effective detection ranges of a plurality of ground-based weather radar stations.

FIG. 2 is a plan view 202 illustrating the effective detection range 116 of the aircraft's onboard weather radar and the respective detection ranges 122a, 122i of the ground-based weather radar stations 102a-102i, respectively. Similar to FIG. 1, reference numerals of the icons of FIG. 2 correspond to the reference numerals of FIG. 1.

Embodiments of the weather radar information system 100 receive weather radar information from the ground-based weather radar stations 102. The weather radar information system 100 processes the received ground-based weather radar information received from the ground-based weather radar stations 102 into a format that may be used by the aircraft 104 and may be used to supplement the weather information determined by the onboard weather radar of the aircraft 104. The processed supplemental weather radar information is communicated to the aircraft 104.

Figure 3:
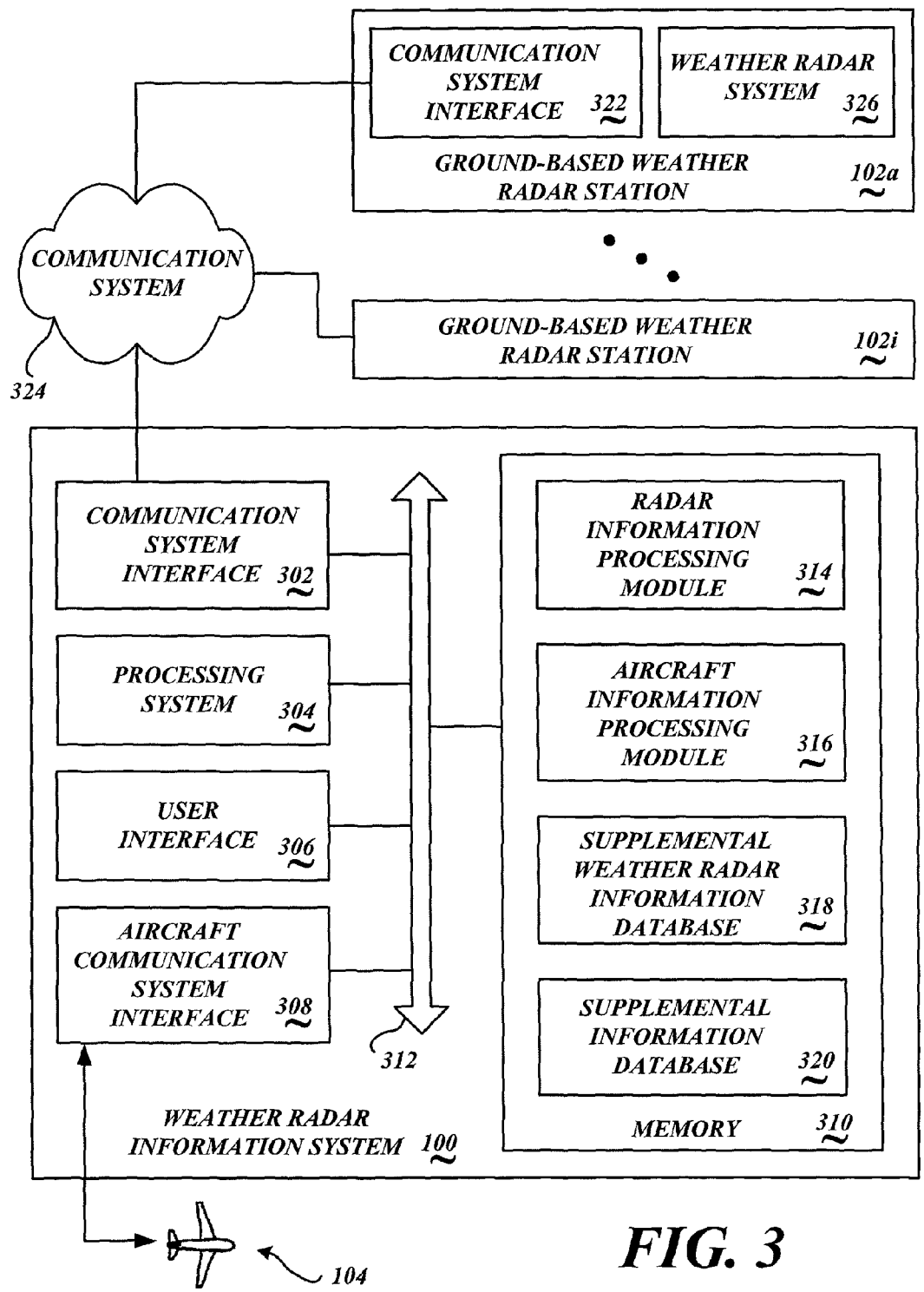
FIG. 3 is a block diagram of an exemplary embodiment of the ground-based weather radar information system.

FIG. 3 is a block diagram of an exemplary embodiment of the ground-based weather radar information system 100. The exemplary embodiment comprises a communication system interface 302, a processing system 304, an optional user interface 306, an aircraft communication system interface 308, and a memory 310. The communication system interface 302, the processing system 304, the optional user interface 306, the aircraft communication system interface 308, and the memory 310 are communicatively coupled to a communication bus 312, thereby providing connectivity between the above-described components. In alternative embodiments of the weather radar information system 100, the above-described components may be communicatively coupled to each other in a different manner. For example, one or more of the above-described components may be directly coupled to the processing system 304, or may be coupled to the processor system 304 via intermediary components (not shown). Further, additional components (not shown) may be included in alternative embodiments of the ground-based weather radar information system 100.

The processing system 304 may be any suitable processor or device. The processing system 304, in an exemplary embodiment, may be a commercially available processor. Examples of commercially available processors include, but are not limited to, a Pentium microprocessor from Intel Corporation, Power PC microprocessor, SPARC processor, PA-RISC processor or 68000 series microprocessor. In other embodiments, the processing system 304 may be a mainframe type processor system. The processing system 304 may be a specially designed and fabricated processor, or may be part of a multi-purpose processing system.

The exemplary memory 310 stores a radar information processing module 314, an optional aircraft information processing module 316, a supplemental weather radar information database 318, and an optional supplemental information database 320. Modules 314, 316 are retrieved and executed by the processing system 304. In alternative embodiments, the modules 314, 316 may be implemented together as a common module, may be integrated into other modules, or reside in other memories (not shown).

The memory 310 may be any suitable memory device or system. Depending upon the embodiment, the memory 310 may be a dedicated memory system, may be part of another component or system, and/or may be a distributed memory system. The memory 310 may also include other logic, modules and/or databases not illustrated or described herein.

The communication system interface 302 is configured to communicatively couple to a corresponding communication system interface 322 at each of the plurality of ground-based weather radar stations 102a-102i. In the illustrated exemplary embodiment, the communication system interface 302 is communicatively coupled to respective ones of the communication system interfaces 322, via communication system 324.

The communication system 324 is illustrated as a generic communication system. In one embodiment, the communication system 324 comprises the Internet. Accordingly, the communication system interfaces 302, 322 are suitable modems or Internet connection devices. Alternatively, the communication system 324 may be a telephony system, a radio frequency (RF) wireless system, a microwave communication system, a fiber optics system, an intranet system, a local access network (LAN) system, an Ethernet system, a cable system, a radio frequency system, a cellular system, an infrared system, a satellite system, or a hybrid system comprised of multiple types of communication media. Additionally, embodiments of the communication system 324 may employ various types of communication technologies, such as but not limited to, digital subscriber loop (DSL), X.25, Internet Protocol (IP), Ethernet, Integrated Services Digital Network (ISDN) and asynchronous transfer mode (ATM). Also, the communication system 324 may be employed on combination systems having a plurality of segments which employ different formats for each segment employing different technologies on each segment. Accordingly, the ground-based weather radar information may be communicated and/or provided to the weather radar information system 100 using any suitable format or media. Further, the communication system interface 302 may be configured to communicate to the plurality of ground-based weather radar stations 102a-102i using a plurality of different communication systems, formats and/or technologies.

The aircraft communication system interface 308 is configured to communicatively couple to a corresponding communication interface residing in an aircraft 104. In an exemplary embodiment, the aircraft communication system interface 308 includes a radio frequency (RF) or other suitable wireless signal transmitter. Alternatively, or additionally, the aircraft communication system interface 308 may remotely reside at another location such that the supplemental weather radar information is communicated from the ground-based weather radar information system 100 to the remotely located aircraft communication system interface 308 via an intermediary communication system, such as, but not limited to, the communication system 324.

In an exemplary application, the aircraft communication system interface 308 supports bidirectional communications between the weather radar information system 100 and the aircraft 104. For example, the weather radar information system 100 may provide supplemental weather radar information to the aircraft 104 in response to a request transmitted from the aircraft 104. The received request may include information pertaining to characteristics of the aircraft's onboard weather radar such that the supplemental weather radar information may be processed in accordance with the aircraft's onboard weather radar characteristics.

Alternatively, or additionally, the aircraft communication system interface 308 may broadcast the supplemental weather radar information to the aircraft 104 that is in reception range of the aircraft communication system interface 308. Thus, as the aircraft 104 comes within reception range of the broadcasted supplemental weather radar information, the aircraft's onboard weather radar system can receive and process the received supplemental weather radar information.

Alternatively, or additionally, the aircraft communication system interface 308 may be communicatively coupled to an intermediary communication system (not shown), and/or may be communicatively coupled to the communication system 324. For example, the aircraft may be able to establish a connection to the Internet while airborne. Here, the aircraft communication system interface 308 supports Internet-based communications with the aircraft 104.

The radar information processing module 314 processes ground-based weather radar information received from the ground-based weather radar stations 102a-102i, as described in greater detail hereinbelow. The processed supplemental weather radar information is stored into the supplemental weather radar information database 318.

In some embodiments, an optional aircraft information processing module 316 processes information pertaining to the aircraft 104. Such information may include the aircraft's current location, planned flight path 106, heading, altitude, and/or velocity. This information may be received from the aircraft 104, and/or may be received from another source. Thus, the weather radar information system 100 can selectively supply supplemental weather radar information to the aircraft 104 based on the aircraft information as described in greater detail hereinbelow.

In some embodiments, an optional supplemental information database 320 stores information of interest that is included with the supplemental weather radar information that is communicated to the aircraft 104. Such supplemental information may include an identifier of the location of the weather radar information system 100, various data formatting information, a time stamp (indicating that the time the supplemental weather radar information was communicated and/or the time that the supplemental weather radar information was collected), and/or information pertaining to terrain, airports, or the like.

The user interface 306 receives input from the an operator of the weather radar information system 100. Accordingly, the operator may provide various management functions on the weather radar information system 100.

Figure 4:
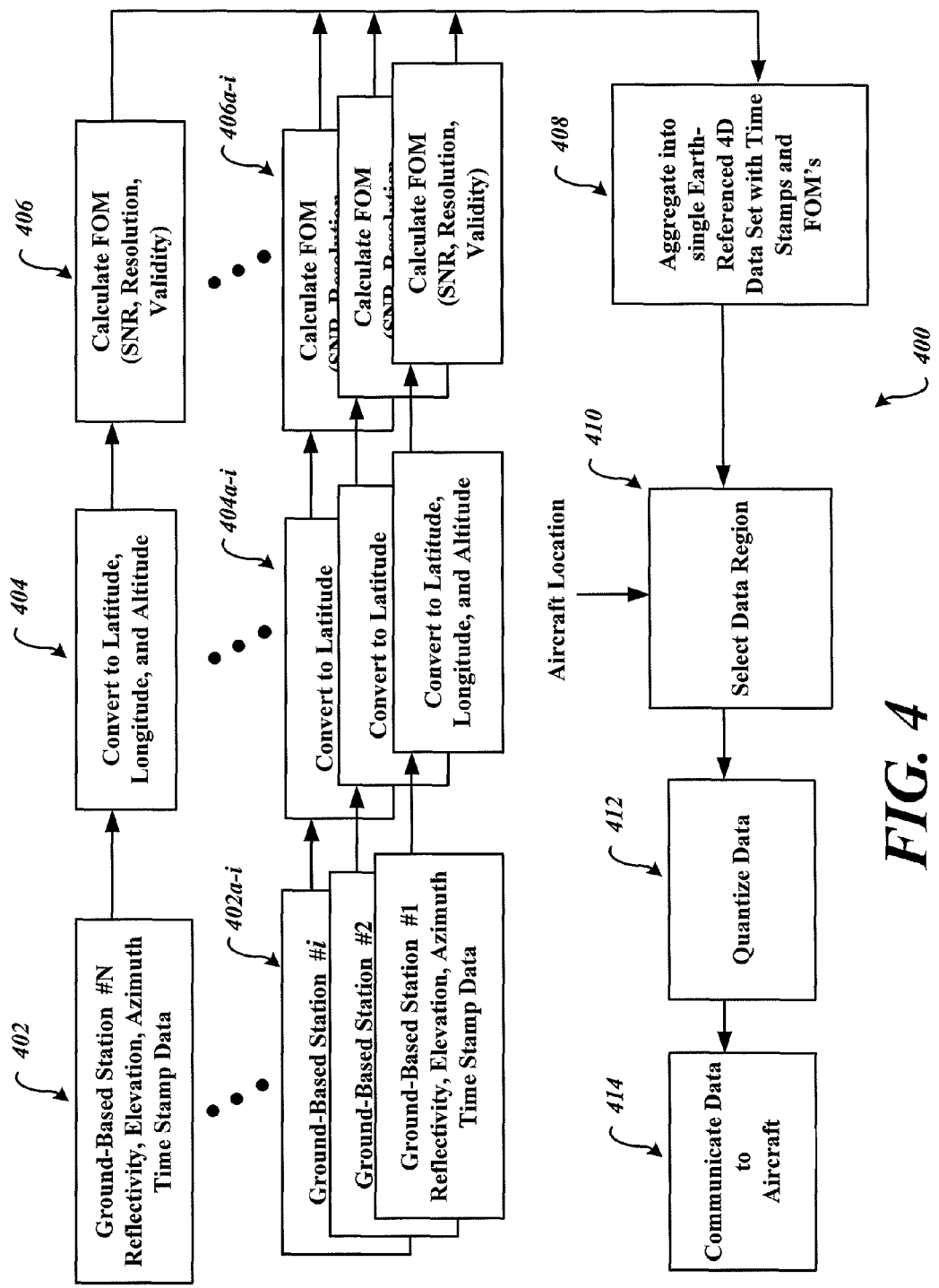
FIG. 4 illustrates an exemplary process of processing supplemental weather radar information from a plurality of ground-based weather radar stations.

FIG. 4 illustrates an exemplary process 400 of processing ground-based weather radar information received from a plurality of ground-based weather radar stations 102 (FIGS. 1 and 2) as performed by the radar information processing module 314. At block 402, ground-based weather radar stations 102, such as, but not limited to, a NEXRAD station, provides ground-based weather radar information that has been detected by its ground-based radar system 326 (FIG. 3).

The ground-based weather radar information can be received from any number of ground-based weather radar stations 102 located within a predefined region. In one exemplary application, the predefined region is a country, such as the United States. Accordingly, all of the ground-based weather radar stations 102 in the United States provide their ground-based weather radar information to the weather radar information system 100. The ground-based weather radar information system 100 processes the received ground-based weather radar information into supplemental weather radar information for the entire country.

In another application, the U.S. is subdivided into a plurality of sub regions. Those ground-based weather radar stations 102a, 102b located in a particular sub region provide their ground-based weather radar information to a regional weather radar information system 100. In some instances, a ground-based weather radar station may be located near regional borders where its respective detection range 122 (FIG. 1) extends into multiple regions. Such ground-based weather radar stations 102 send their ground-based weather radar information to the respective regional weather radar information systems 100.

As noted at block 402, the ground-based weather radar information may include reflectivity information, elevation information, azimuth information, and/or a time stamp. Additional information may also be included, such as information identifying the presence and/or nature of precipitation, and/or presence and/or nature of turbulence, and information pertaining to the particular ground-based weather radar station 102.

At block 404, the received ground-based weather radar information is converted into a latitude, longitude, and altitude format. For example, the received ground-based weather radar information may be provided by a ground-based weather radar station 102 using polar coordinates or the like. Based upon the polar coordinate location of the detected weather, and the known location of the ground-based weather radar station 102, the location of weather detected by the ground-based weather radar station 102 can be referenced to earth-based latitude, longitude, and altitude coordinates. Since the aircraft receiving the supplemental weather radar information from the weather radar information system 100 can determine its current location in terms of its earth-based latitude, longitude, and altitude, the aircraft 104 can reference received supplemental weather radar information (provided in a latitude, longitude, and altitude format) to its current location using its aircraft weather radar system.

Preferably, the supplemental weather radar information is determined for a three-dimensional (3-D) region of air space comprised of arrayed cells. An arrayed cell is referred to herein as a voxel. For example, but not limited to, the airspace may be predefined as regions of adjacent voxels each defined by its respective earth-based latitude, longitude, and altitude. Thus, the weather information received from the ground-based weather radar station 102, which may be specified in polar coordinates referenced to the geographic location of the ground-based weather radar station 102, may be processed into weather information that is associated to a respective voxel. Alternatively, the supplemental weather radar information is determined for a two-dimensional (2-D) surface region of the earth. For example, but not limited to, the airspace may be defined by its respective earth-based latitude and longitude.

At block 406, the received ground-based weather radar information is optionally processed to define a figure of merit (FOM). The figure of merit characterizes the quality of the supplemental weather radar information. For example, the signal to noise ratio (SNR) for received radar returns from weather may be used to determine a figure of merit. Some embodiments may alternatively, or additionally, use resolution and/or validity of the ground-based weather radar information to determine a figure of merit. As another example of a considered figure of merit factor, the range of the detected weather out from the ground-based weather radar station 102 may impact the accuracy of the location of the detected weather. Thus, weather that is relatively close to the detecting ground-based weather radar station 102 would have a higher figure of merit than farther out detected weather. Any suitable characteristic pertaining to the weather detected by the ground-based weather radar station 102 may be used to determine the figure of merit. In an alternative embodiment, the figure of merit is determined before conversion of the weather data into latitude, longitude, and altitude information.

At block 408, the ground-based weather radar information that has been converted into latitude, longitude, and altitude coordinates is stored as the supplemental weather radar information into the supplemental weather radar information database 318 for the predefined air space region comprising adjacent voxels defined by their respective latitude, longitude, and altitude. The weather information for each voxel includes reflectivity information, a time stamp corresponding to the time of detection, an optional figure of merit value, and other information of interest. For example, information indicating precipitation intensity, precipitation type, and/or turbulence may be optionally included. The supplemental weather radar information may be stored using any suitable database format.

In some instances, the respective detection ranges 122 of adjacent ground-based weather radar stations 102 overlap. Accordingly, two sets of ground-based weather radar information and/or supplemental weather radar information may be determinable for the same voxel when adjacent ground-based weather radar stations 102 provide weather information for the an overlapping region of space. An exemplary embodiment selects the weather information having the highest figure of merit for inclusion into the supplemental weather radar information database 318. Another embodiment uses the most current information as the supplemental weather radar information. Yet another embodiment blends the overlapping ground-based weather radar information or the supplemental weather radar information to define a blended value of supplemental weather radar information. For example, blending may be based on the relative figure of merit value. Blending may be based on any suitable factor.

An exemplary embodiment, at block 410, receives a request from the aircraft 104 for the supplemental weather radar information. The request may be received in any suitable format and/or over any suitable medium. The request for the supplemental weather radar information, in this exemplary embodiment, preferably includes location information (at least latitude and longitude) for the aircraft 104. The request may optionally include information about the planned flight path 106 for the aircraft 104. In some embodiments, the planned flight path 106, current heading, and/or current velocity of the requesting aircraft 104 may be provided.

Based upon the location of the aircraft 104, and optionally information about the planned flight path 106, current aircraft heading, and/or current aircraft velocity, the weather radar information system 100 defines a geographic region of interest that is pertinent to the requesting aircraft 104. Then, a data region of voxels can be identified which have supplemental weather radar information for the geographic region of interest for that particular aircraft 104. The identified supplemental weather radar information (identified by voxel location) is retrieved from the supplemental weather radar information database 318.

In one embodiment, a geographic region of interest may be one of a plurality of predefined geographic regions. The location of the requesting aircraft 104 is correlated with the boundaries of the predefined geographic regions to identify the geographic region of interest that the requesting aircraft 104 is currently in (or may be in the near term). Alternatively, flight characteristics of the aircraft, such as, but not limited to its planned flight path 106, current heading, and/or current velocity, may be used to identify the predefined geographic region of interest. In yet other embodiments, the crew of the requesting aircraft may specify one or more predefined geographic regions of interest.

In some embodiments, a plurality of predefined geographic regions of interest may be selected. For example, information about the planned flight path 106, and/or the current heading and current velocity of the requesting aircraft 104 may be used to identify a plurality of pertinent predefined geographic regions of interest that the aircraft 104 will likely traverse through. As another example, the crew of the aircraft 104 may be interested in learning about weather at their destination, and accordingly, one or more geographic regions of interest between the aircraft 104 and its destination may be identified.

At block 412, an exemplary embodiment optionally quantizes the supplemental weather radar information for the identified geographic region(s) of interest to facilitate communication of the data to the requesting aircraft 104 at block 414. For example, weather reflectivity information for a particular voxel may be represented by a relatively large bit word (having a relatively large number of significant bits therein). The relatively large number of significant bits is used to describe the weather reflectivity information with a relatively high degree of discrimination, resolution and/or granularity as detected by the ground-based weather radar station 102. However, there may be no significant benefit in providing weather information of a very high degree of discrimination, resolution and/or granularity to the aircraft 104 since, when the weather information is presented on the aircraft's radar display, the weather information is shown using a limited number of colors and/or using a limited range of intensities that is represented using a relatively small bit word. For example, severe weather may only be shown a bright magenta color on the radar display which may be defined by a bit word that uses, for example, three or four bits. Thus, the supplemental weather radar information may be processed by the weather radar information system 100 into a bit word with fewer significant bits so as to reduce communication bandwidth and communication time requirements. (The receiving aircraft 104 may optionally further process the received supplemental weather radar information to satisfy the particular bit word format of its weather radar system.)

In an alternative embodiment, the processing of the supplemental weather radar information described in block 412 is performed as part of the process of block 408. That is, the data is processed prior to, or as part of, generating the voxel-based supplemental weather radar information stored into the supplemental weather radar information database 318. Thus, memory capacity required for storing the supplemental weather radar information database 318 may be minimized or better managed. On the other hand, if the requesting aircraft identifies its type of weather radar system and/or specifies a preferred data format, the weather radar information system 100 may process the supplemental weather radar information into an optimal format for that particular aircraft.

Figure 5:
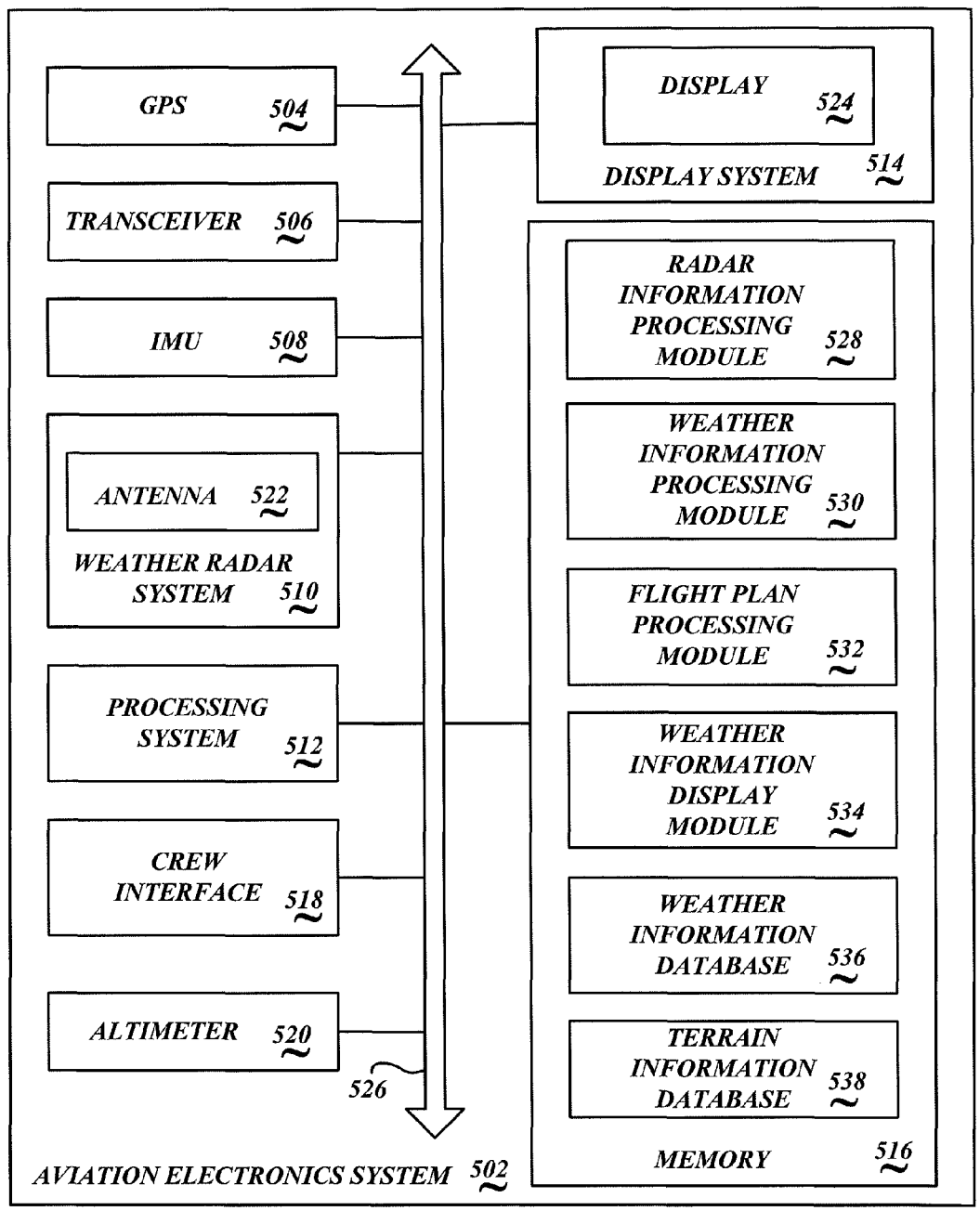
FIG. 5 is a block diagram of an exemplary embodiment of the ground-based weather radar information communication system implemented in an aviation electronics system of the aircraft.

FIG. 5 is a block diagram of an embodiment of an aviation electronics system 502 of the aircraft 104 that is configured to receive, process and integrate supplemental weather radar information received from embodiments of the weather radar information system 100 with weather information that is collected by the aviation electronics system 502. The exemplary aviation electronics system 502 includes a global positioning system (GPS) 504, a transceiver 506, an inertial measurement unit (IMU) 508, a weather radar system 510, a processing system 512, a display system 514, a memory 516, a crew interface 518, and an altimeter 520. The weather radar system 510 includes an antenna 522 that is operable to emit radar signals and receive radar returns. The display system 514 includes a display 524. It is appreciated that the aviation electronics system 502 may not include all of the above components, and/or may include other components and/or systems that are not illustrated or described herein.

The above-described components, in an exemplary embodiment, are communicatively coupled together via communication bus 526. In alternative embodiments of the aviation electronics system 502, the above-described components may be communicatively coupled to each other in a different manner. For example, one or more of the above-described components may be directly coupled to the processing system 512, or may be coupled to the processing system 512 via intermediary components (not shown).

The weather radar system 510 may be any suitable radar system, such as, but not limited to, a weather radar that is operable to detect weather that is located relatively far away from the aircraft 104. The antenna 522 is operable to emit radar pulses and to receive weather radar returns (from weather, such as the storm cells 110, 112, 114) and terrain radar returns (from terrain, such as the mountain range 118).

The GPS 504 determines the current location of the aircraft 104. The altimeter 520 determines altitude of the aircraft. The altimeter 520 may determine altitude based on air pressure and/or radio signals received from sources having precise known elevations, such as an airport. The IMU 508 may also be used to determine the current location and/or altitude, or supplement determination of the current location and/or altitude, of the aircraft 104. The information may be provided to embodiments of the ground-based weather radar information system 100 so that pertinent supplemental weather radar information may be provided to the aircraft 104.

The crew interface 518 receives input from the crew of the aircraft 104. Accordingly, the crew may optionally elect to view only radar information detected by the weather radar system 510, may elect to view the ground-based supplemental weather radar information, or to view a combination of both.

Transceiver 506 is a communication device that is operable to receive the supplemental weather radar information provided by the ground-based weather radar information system 100. Any suitable transceiver system or device may be used. In an exemplary embodiment, the transceiver 506 is configured to establish an Internet connection while the aircraft 104 is in flight. Alternatively, or additionally, the transceiver 506 may be configured to communicate with the aircraft communication system interface 308 of the weather radar information system 100 (FIG. 3) using a suitable wireless signal. Alternatively, or additionally, the transceiver may be configured to receive a broadcasted wireless signal having the supplemental weather radar information therein. The transceiver 506 may be configured for other communication functions.

An exemplary embodiment of the aviation electronics system 502 comprises a plurality of cooperatively acting modules. The modules are identified as a radar information processing module 528, a ground-based weather radar information processing module 530, a flight plan processing module 532, and a weather information display module 534. Modules 528, 530, 532, 534, reside in the memory 516, and are retrieved and executed by the processing system 512. In other embodiments, the modules 528, 530, 532, 534, may be implemented together as a common module, may be integrated into other modules, or reside in other memories (not shown).

In an exemplary embodiment, a weather information database 536 and an optional terrain information database 538 are stored in memory 516. Preferably, the weather information database 536 includes 3-D weather information represented as voxels in a region of space about the aircraft 104. Alternatively, or additionally, the weather information database 536 may include 2-D weather information. The optional terrain information database 538 includes location information and elevation information of terrain over which the aircraft 104 is traversing. Alternatively, the weather information database 536 and/or the terrain information database 538 may be implemented with other databases, may be implemented in various formats, such as a buffer or the like, and/or may be implemented in another memory.

The radar information processing module 528 processes radar returns detected by the antenna 522 of the radar system 510 into weather information. Weather radar returns may be associated with various types of weather. The radar information processing module 528 may determine the type of detected weather, and their associated attributes such as location, vertical extent, and/or severity. The determined weather information is saved into corresponding bins (2-D) or voxels (3-D) in the weather information database 536.

The ground-based weather radar information processing module 530 is configured to process the received supplemental weather radar information to determine the location and extent of weather detected by the plurality of ground-based weather radar stations 102a-102i. The location and extent of the weather detected by the ground-based weather radar stations 102a-102i is determined with respect to the current location of the aircraft 104. The processed ground-based weather radar information may be saved into the corresponding bins (2-D) or voxels (3-D) in the weather information database 536, and/or saved into another suitable memory or buffer.

The weather information display module 534 accesses the weather information stored in the weather information database 536 and constructs a displayable image corresponding to a graphical presentation of the local weather information. The weather information in the weather information database 536 includes weather detected by the weather radar system 510 and the received supplemental weather radar information. The displayable image of the weather information is communicated to the display system 514 and is presented on the display 524. The displayable image, in some embodiments, is in the form of bit map data.

In some situations, the onboard weather radar system 510 may have difficulties distinguishing between valid weather radar returns and terrain radar returns, or in regions near the effective detection range 116 of the onboard weather radar system 510. Accordingly, the presence (or absence) of weather identified in the ground-based supplemental weather radar information may be incorporated into the displayed weather information. An exemplary embodiment compares a radar return from the aircraft's onboard weather radar system 510 with the supplemental weather radar information received from the ground-based weather radar information system 100. Then, the aviation electronics system 502 determines which weather information to display. For example, if the detected weather is within the effective detection range 116 of the onboard weather radar system 510, then weather information from the onboard weather radar system 510 is used to generate a radar display. On the other hand, if the weather is beyond the effective detection range 116 of the onboard weather radar system 510, then the supplemental weather radar information will be used to generate the radar display.

The received supplemental weather radar information may encompass the region of airspace that correspond to the effective detection range 116 of the weather radar system 510 of the aircraft 104. This supplemental weather radar information in such regions of airspace may be ignored, or may be blended, or may otherwise be incorporated into the displayed weather. For example, the crew of the aircraft may choose to initially incorporate the overlapping weather information, and then later choose to omit the supplemental weather radar information in the region of airspace that corresponds to the effective detection range 116 of the weather radar system 510 of the aircraft 104.

The optional flight plan processing module 532 processes flight plan information, which corresponds to the illustrated planned flight path 106 (FIGS. 1 and 2). Information corresponding to the planned flight path 106 may be provided by the flight plan processing module 532 and communicated to the weather radar information system 100 so that supplemental weather radar information pertinent to the planned flight path 106 can be communicated to the aircraft 104. Alternatively, or additionally, information pertaining to the planned flight path 106 may be used to selectively process the received supplemental weather radar information. That is, supplemental weather radar information of interest can be identified and processed, thereby avoiding the need to process all of the received supplemental weather radar information.

Figure 6:
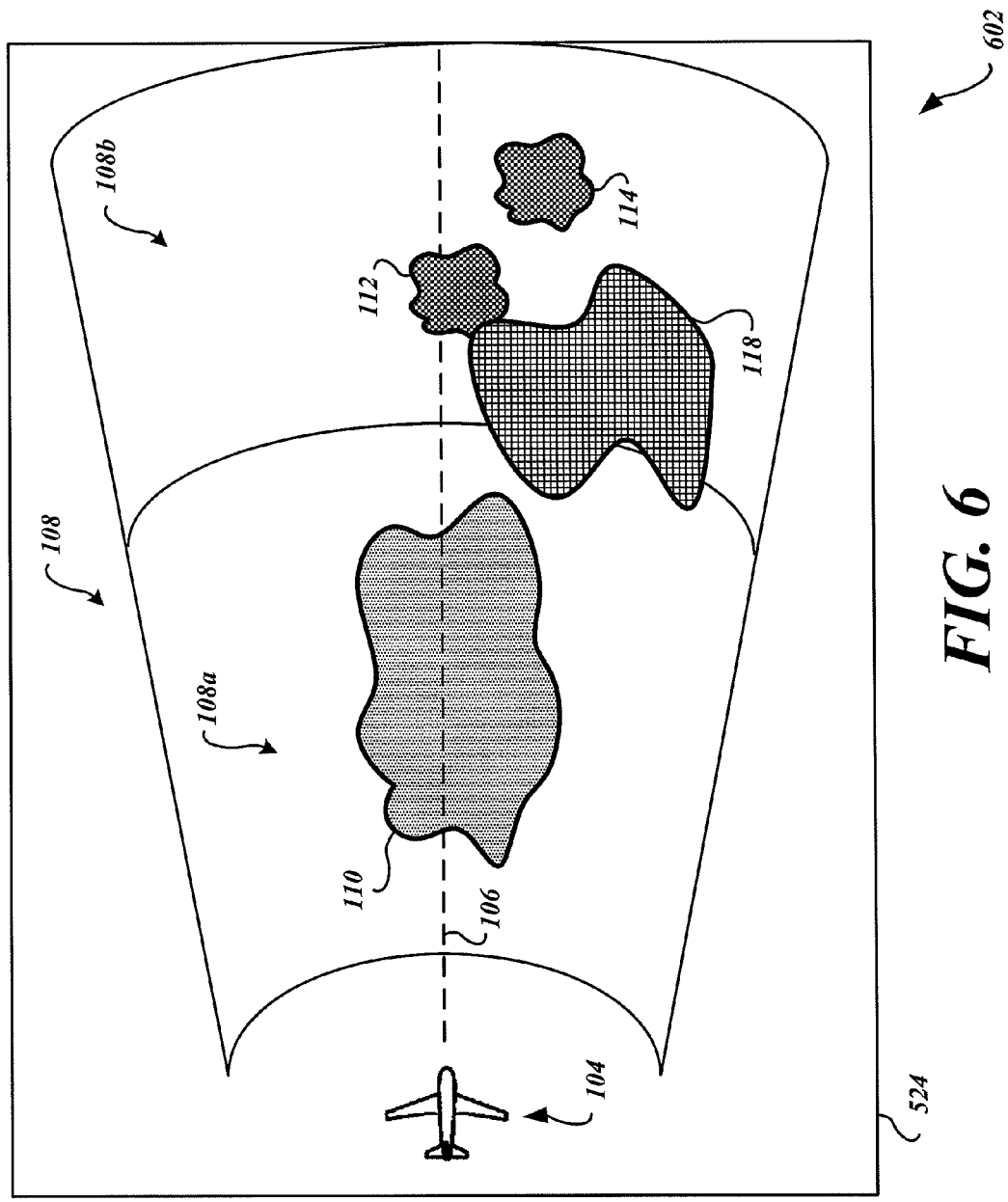
FIG. 6 is weather radar display image of the planned flight path through the plurality of storm cells based upon the aircraft's onboard weather radar system and information received from ground-based weather radar systems.

FIG. 6 is weather radar display image 602 of the planned flight path through the plurality of storm cells 110, 112, 114 based upon the aircraft's onboard weather radar system 510 and information provided by the ground-based weather radar stations 102. Similar to FIG. 1, reference numerals of the icons of FIG. 6 correspond to the reference numerals of FIG. 1.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method that prepares ground-based supplemental weather radar information for integration with onboard weather radar information, the method comprising:
   receiving ground-based weather radar information from a ground-based weather radar station, the ground-based weather radar information referenced in a first coordinate system, wherein the first coordinate system is a polar coordinate system referenced to a location of the ground-based weather radar station;
   converting the received ground-based weather radar information in the first coordinate system to ground-based weather radar information referenced in a second coordinate system, wherein the second coordinate system is different from the first coordinate system, and wherein the second coordinate system is based upon at least earth-based latitude and longitude;
   generating supplemental weather radar information from the received ground-based weather radar information, wherein the supplemental weather radar information is referenced to the second coordinate system; and
   communicating the supplemental weather radar information, wherein the communicated supplemental weather radar information is integrated with weather radar information of an onboard weather radar system of an installation vehicle.

2. The method of claim 1, wherein the second coordinate system includes altitude.

3. The method of claim 1, further comprising:
   identifying a geographic region of interest to the installation vehicle; and
   selecting supplemental weather radar information of interest within the identified geographic region of interest.

4. The method of claim 1, wherein a portion of the supplemental weather radar information is represented using a first bit word, and further comprising:
   modifying the representation of the supplemental weather radar information from the first bit word to a second bit word, wherein the first bit word has a greater number of significant bits that the second bit word.

5. The method of claim 1, further comprising:
   receiving a request for the supplemental weather radar information from the installation vehicle, wherein the supplemental weather radar information is communicated in response to receiving the request.

6. The method of claim 5, wherein the request includes information indicating a planned flight path of an aircraft, and further comprising:
   identifying a geographic region of interest to the installation vehicle based upon the planned flight path; and
   selecting supplemental weather radar information of interest within the identified geographic region of interest.

7. The method of claim 5, wherein the request includes information indicating at least one of a location, a heading and a velocity of the installation vehicle, and further comprising:
   identifying a geographic region of interest to the installation vehicle based upon the at least one of the location, the heading, and the velocity; and
   selecting supplemental weather radar information of interest within the identified geographic region of interest.

8. The method of claim 1, communicating the supplemental weather radar information comprises:
   broadcasting the supplemental weather radar information over a wireless medium.

9. The method of claim 1, communicating the supplemental weather radar information comprises:
   communicating the supplemental weather radar information over the Internet.

10. A system that prepares ground-based supplemental weather radar information for integration with onboard weather radar information, comprising:
    a communication system interface that receives ground-based weather radar information from a ground-based weather radar station, the ground-based weather radar information referenced in a first coordinate system that is a polar coordinate system referenced to a location of the ground-based weather radar station;
    a processing system coupled to the communication system interface, wherein the processing system is configured to convert the first coordinate system of the ground-based weather radar information to a second coordinate system different from the first coordinate system and based upon at least earth-based latitude and longitude, and wherein the processing system is configured to generate supplemental weather radar information from the received ground-based weather radar information referenced to the second coordinate system; and
    a supplemental weather radar information communication system interface coupled to the processing system and configured to communicate the supplemental weather radar information, wherein the communicated supplemental weather radar information is integrated with weather radar information of an onboard weather radar system of an installation vehicle.

11. The system of claim 10, wherein the second coordinate system includes altitude.

12. The system of claim 10, wherein the processing system is configured to identify a geographic region of interest to the installation vehicle, and select supplemental weather radar information of interest within the identified geographic region of interest.

13. The system of claim 10, wherein a portion of the supplemental weather radar information is represented using a first bit word, and wherein the processing system is configured to modify a representation of the supplemental weather radar information from the first bit word to a second bit word, wherein the first bit word has a greater number of significant bits that the second bit word.

14. The system of claim 10, wherein the supplemental weather radar information communication system interface is configured to receive a request for the supplemental weather radar information from the installation vehicle, and wherein the supplemental weather radar information is communicated in response to receiving the request.

15. The system of claim 14, wherein the request includes information indicating a planned flight path of an aircraft, and wherein the processing system is configured to identify a geographic region of interest to the installation vehicle based upon the planned flight path, and wherein the processing system is configured to select supplemental weather radar information of interest within the identified geographic region of interest.

16. The system of claim 10, wherein the supplemental weather radar information is communicated over the Internet.

17. A method that integrates onboard weather radar information and ground-based supplemental weather radar information, the method comprising:

receiving a radar weather return from a weather radar system on board an installation vehicle;

receiving the supplemental weather radar information, wherein the supplemental weather radar information is generated from ground-based weather radar information received from at least one ground-based weather radar station, wherein the supplemental weather radar information is based of a polar coordinate system referenced to at least a latitude and longitude location of the ground-based weather radar station;

converting the received ground-based weather radar information in the polar coordinate system to ground-based weather radar information referenced in a second coordinate system, wherein the second coordinate system is different from the first coordinate system, and wherein the second coordinate system is based upon at least latitude and longitude of the installation vehicle; and generating a radar image showing the weather radar return integrated with the supplemental weather radar information.

18. The method of claim 17, further comprising:
displaying the radar image on a display.

19. The method of claim 17, wherein the polar coordinate system of the supplemental weather radar information received from the ground-based weather radar station is further referenced to an altitude of the ground-based weather radar station.

20. The method of claim 1, wherein the second coordinate system is based upon at least the latitude and longitude of the installation vehicle.

* * * * *